United States Patent [19]
Hunger et al.

[11] 3,947,516
[45] Mar. 30, 1976

[54] NOVEL AROMATIC ALDEHYDES AND PROCESS FOR PREPARING THEM

[75] Inventors: Klaus Hunger, Kelkheim, Taunus; Theodor Papenfuhs, Frankfurt am Main, both of Germany

[73] Assignee: Hoechst Aktiengesellschaft, Frankfurt am Main, Germany

[22] Filed: July 18, 1974

[21] Appl. No.: 489,538

[30] Foreign Application Priority Data
July 20, 1973   Germany............................ 2337023

[52] U.S. Cl. ...... 260/559 S; 260/250 Q; 260/251 Q; 260/309.2
[51] Int. Cl.[2]...................................... C07C 103/26
[58] Field of Search................................ 260/559 S

[56] References Cited
OTHER PUBLICATIONS
Choubal et al., J. Indian Chem. Soc., 35, No. 12, 1958 pp. 860–864.
Chem. Abs., 53, 3709g (1959)—Kracker et al.
Chem. Abs., 51 5022–5024 (1957) Turitsyana et al.

*Primary Examiner*—C. Davis
*Attorney, Agent, or Firm*—Curtis, Morris & Safford

[57] ABSTRACT

Aldehydes of a 2-hydroxy-naphthalene-3-carboxylic acid arylide of the general formula

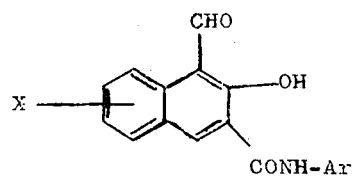

in which X represents a hydrogen, chlorine or bromine atom, and Ar represents a naphthyl group, a benzimidazolone, chlorobenzimidazoline, quinazolone, quinoxaline, phthalimide, phthalazine group or a phenyl group which may carry 1 to 3 lower alkyl, lower alkoxy, lower alkylsulfonyl, lower carboalkoxy, halogen, trifluoromethyl, nitro, cyano, lower alkanoylamino, benzoylamino, carboxamido or sulfonamido groups and a process for their preparation wherein the corresponding 2-hydroxynaphthalene-3-carboxylic acid arylide is reacted in a lower aliphatic carboxylic acid with hexamethylene tetramine and a mineral acid.

These aldehydes are valuable intermediate products for the synthesis of optical brighteners, pharmaceuticals and, in particular, of azamethine pigments which are obtained by condensation of these aldehydes with suitable amines. The pigments thus obtained are distinguished by good fastness properties and are especially suitable for the printing of paper and the coloring of lacquers, varnishes and plastics.

14 Claims, No Drawings

NOVEL AROMATIC ALDEHYDES AND PROCESS FOR PREPARING THEM

The present invention relates to novel aldehydes of 2-hydroxy-naphthalene-3-carboxylic acid arylides of the general formula I

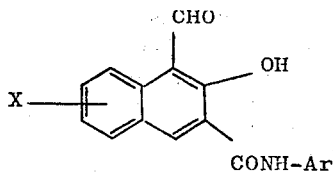

in which X stands for a hydrogen, chlorine or bromine atom, and Ar stands for a naphthyl group, a phenyl group which may carry one to three lower alkyl, lower alkoxy, lower alkylsulfonyl, lower carbalkoxy, halogen, trifluoromethyl, nitro, cyano, lower alkanoylamino, carboxamido or sulfoamido groups, a benzimidazolone, chlorobenzimidazolone, quinazolone, quinoxaline, phthalimide or phthalazine group.

The present invention moreover relates to a process for preparing these aldehydes, wherein a 2-hydroxy-naphthalene-3-carboxylic acid arylide of the general formula II

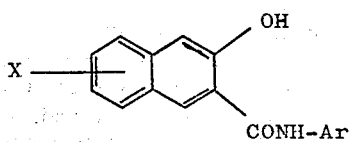

in which X and Ar are defined as above, is reacted with hexamethylene tetramine in the presence of a lower aliphatic carboxylic acid.

As radicals Ar in the general formula II, there are mentioned, for examples: Phenyl, ortho-, meta-, para-tolyl, ortho-, meta-, para-methoxyphenyl, ortho-, meta-, para-ethoxyphenyl, ortho-, meta-, para-chlorophenyl, ortho-, meta-, para-bromo-phenyl, ortho-, meta-, para-nitrophenyl, 2,4-dimethylphenyl, 2,5-dimethoxyphenyl, 2,4-dichlorophenyl, 2,5-dichlorophenyl, 2,4,5-trichlorophenyl, 2-chloro-3-methyl-phenyl, 2-chloro-4-methyl-phenyl, 2-chloro-5-methyl-phenyl, 3-chloro-2-methyl-phenyl, 4-chloro-2-methyl-phenyl, 2-methoxy-5-chlorophenyl, 2,5-dimethoxy-4-chlorophenyl, 2,4-dimethoxy-5-chlorophenyl, 2-methoxy-4-chloro-5-methyl-phenyl, 4-acetylamino-phenyl, 4-benzoylamino-phenyl, benzimidazolyl, phthalimide, quinoxalyl, quinazolyl or phthalazinyl. Further examples of compounds of the general formula II are cited in Colour Index, 3rd edition, Vol. 4, pages 4356 to 4360. By the term "lower", there are to be understood according to this invention groups containing 1 to 4 carbon atoms.

For the reaction of the 2-hydroxy-naphthoic acid arylide with hexamethylene tetramine, the starting compound is dissolved or suspended, generally, in two to ten times its amount of an aliphthatic carboxylic acid and the solution or suspension is heated for a prolonged time to temperature of up to 120°C, preferably from 80° to 100°C, the addition of a small amount of a mineral acid, such as sulfuric acid or hydrochloric acid being necessary except for trifluoroacetic acid used as the carboxylic acid. The acid may be added directly in admixture with the carboxylic acid or subsequently. Suitable lower carboxylic acids are, above all, acetic acid, but also propionic acird, butyric acid or valeric acid, moreover, dicarboxylic acids, such as adipic acid or malonic acid, or halogenated fatty acids, such as chloroacetic acid, trichloroacetic acid or trifluoroacetic acid.

Hexamethylene tetramine may also be replaced by a likewise reacting mixture of ammonia and formaldehyde, these two components being used in an aqueous solution or in gaseous state.

Hexamethylene tetramine is employed in a stoichiometric amount or in a small excess. In addition, paraformaldehyde may also be used in a molar ratio of 1:1 to 3:1, calculated on the starting compound.

In this manner, the aldehydes of the invention are obtained with a good yield and in high purity. These aldehydes are valuable intermediate products for the synthesis of optical brighteners, pharmaceuticals and, in particular, of azamethine pigments which are obtained by condensation of these aldehydes with suitable amines, for example with aniline which may carry 1 to 3 chlorine or bromine atoms, methyl, ethyl, methoxy, ethoxy, nitro, alkyl- or arylsulfonyl groups. The pigments thus obtained are distinguished by good fastness properties and are especially suitable for the printing of paper and the coloring of lacquers, varnishes and plastics.

The following Examples illustrate the invention.

EXAMPLE 1

26.3 Grams of 2-hydroxy-3-naphthoyl-aniline were mixed with 100 ml of glacial acetic acid, 14 g of hexamethylene tetramine and 14 g of paraformaldehyde. The mixture was heated to 85°C, whereupon a clear yellow solution was obtained, to which 20 ml of concentrated hydrochloric acid were added dropwise. Stirring was then continued for 30 minutes at 85°C. The mixture was then cooled to 5°C, the precipitated product was suction-filtered, washed with water until free from acid and dried. 16.9 Grams of faintly yellow 1-aldehyde of 2-hydroxy-3-hapthoylaniline were obtained, melting point: 211°C.

EXAMPLE 2

35.7 Grams of 2-hydroxy-3-naphthoyl-2',5'-dimethoxy-4'-chloroaniline were heated to 115°C together with 14 g of hexamethylene tetramine and 10 g of paraformaldehyde in 200 ml of glacial acetic acid. After 15 minutes, 20 ml of concentrated hydrochloric acid were added. Heating was continued at 116°C for 3 hours, the mixture was then cooled below 10°C, suctionfiltered and the precipitated crystals were washed with water until free from acid. 32 g of faintly yellowish crystals of 1-aldehyde-2-hydroxy-3-naphthoyl-2',5'-dimethoxy-4'-chloroaniline were obtained, m.p. 236°C.

EXAMPLE 3

27.7 Grams of 2-hydroxy-3-naphthoyl-2'-methyl-aniline were mixed with 12 g of hexamethylene tetramine and 12 g of paraformaldehyde and the mixture was heated to 100°C in 200 ml of glacial acetic acid. After a clear solution had been obtained, 15 ml of concentrated hydrochloric acid were added, and heating was continued at 90°C for another 2 hours. The mixture was then cooled with ice to 5° – 10°C, whereupon the 1-aldehyde of 2-hydroxy-3-naphthoyl-2'-methyl-aniline crystallized. Yield: 12.9 g, m.p. 172 – 174°C.

EXAMPLE 4

32 Grams of 2-hydroxy-3-naphthoyl-4'-acetylamino-aniline were heated to 90°C together with 100 ml of glacial acetic acid, 14 g of hexamethylene tetramine and 14 g of paraformaldehyde. After a solution had been obtained, 20 ml of concentrated hydrochloric acid were added. Stirring was continued for 2 hours at 90°C, the solution was cooled to 5°C and the white crystallized precipitate of 1-aldehyde-2-hydroxy-3-naphthoyl-4'-acetylamino-aniline was suction-filtered, washed and dried. Yield: 18.9 g, m.p. 234°C.

EXAMPLE 5

63.8 Grams of 2-hydroxy-3-naphthoyl-(5'-aminobenzimidazolone) were mixed with 28 g of hexamethylene tetramine and 5 g of paraformaldehyde and mixed while stirring with 60 ml of glacial acetic acid and 75 ml of concentrated hydrochloric acid for 4 hours at 100°C. The clear solution was allowed to cool, the precipitated product was suction-filtered, washed with water and dried. 54.6 g of 1-aldehyde of 2-hydroxy-3-naphthoyl-(5'-amino-benzimidazolone) were obtained, m.p. 260°C.

EXAMPLE 6

9.8 Grams of 2-hydroxy-3-naphthoyl-2',5'-dimethoxy-4'-chloroaniline of 91.5 % strength and 3.5 g of urotropin were slowly heated in 30 ml of trifluoroacetic acid. At 60°C, a solution was obtained. Temperature was raised to 95°C which was maintained for 30 minutes. The hot reaction mixture was then placed onto 200 g of ice water. The precipitated product was suction-filtered, carefully washed with water and dried. The 1-aldehyde of 2-hydroxy-3-naphthoyl-2',5'-dimethoxy-4'-chloroaniline was uniform according to thin layer chromatography. Yield: 9.5 g, m.p. 236°C.

We claim:
1. A compound of the formula

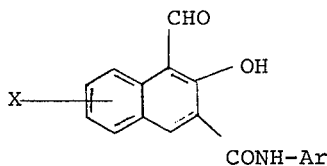

wherein X is hydrogen, chlorine or bromine and Ar is naphthyl or phenyl which may be substituted by 1 to 3 substituents of the group of alkyl with 1–4 C-atoms, alkoxy with 1–4 C-atoms, alkylsulfonyl with 1–4 C-atoms, carbalkoxy with 1–4 C-atoms, chlorine, bromine, trifluoromethyl, nitro, cyano, benzoylamino, alkanoylamino with 1–4 C-atoms, carbonamido or sulfonamido.

2. A compound of the formula

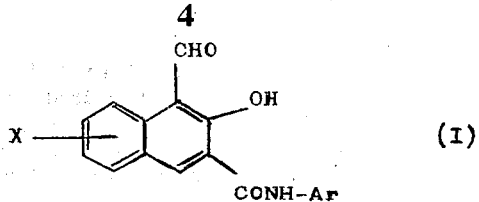

wherein X is hydrogen, chlorine or bromine and Ar is phenyl which may be substituted by 1 to 3 substituents of the group of methyl, ethyl, methoxy, ethoxy, chlorine, bromine, nitro, acetylamino or benzoylamino.

3. The compound of claim 2 in which X is hydrogen and Ar is phenyl.

4. The compound of claim 2 in which X is hydrogen and Ar is 2', 5'-dimethoxy-4'-chlorophenyl.

5. The compound of claim 2 in which X is hydrogen and Ar is o-tolyl.

6. The compound of claim 2 in which X is hydrogen and Ar is p-acetylaminophenyl.

7. In a process for the preparation of a compound as defined in claim 1 by reacting a compound of the formula

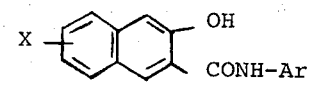

in which X and Ar are defined as in claim 1, with hexamethylene tetramine in a lower aliphatic carboxylic acid with addition of a mineral acid, the improvement comprising: dissolving or suspending the starting materials in said lower aliphatic carboxylic acid; adding the mineral acid; and heating the mixture to a temperature of up to 120°C.

8. A process as claimed in claim 7, wherein the mineral acid is added at the beginning or after a solution is obtained.

9. A process as claimed in claim 7, where hexamethylenetetramine is formed in situ from ammonia and formaldehyde.

10. A process as claimed in claim 7, wherein the lower aliphatic carboxylic acid is acetic acid, propionic acid, butyric acid, valeric acid, adipic acid, malonic acid, chloroacetic acid, trichloroacetic acid or trifluoroacetic acid.

11. A process as claimed in claim 7, wherein the mineral acid is sulfuric or hydrochloric acid.

12. A process as claimed in claim 7, wherein the lower aliphatic carboxylic acid is trifluoro acetic acid and wherein no mineral acid is added.

13. A process as claimed in claim 7, wherein the said temperature is 80° to 100°C.

14. A process as claimed in claim 7, wherein stoichiometric amounts or a small excess of hexamethylenetetramine are reacted.

* * * * *

Disclaimer 3,947,516.—*Klaus Hunger*, Kelkheim, Taunus, and *Theodor Papenfuhs*, Frankfurt/Main, Germany. NOVEL AROMATIC ALDEHYDES AND PROCESS FOR PREPARING THEM. Patent dated Mar. 30, 1976. Disclaimer filed Jan. 25, 1977, by the assignee, *Hoechst Aktiengesellschaft*.

Hereby enters this disclaimer to claims 1 to 6 of said patent.

[*Official Gazette March 22, 1977.*]